United States Patent
Zhao et al.

(10) Patent No.: US 9,022,084 B2
(45) Date of Patent: May 5, 2015

(54) PASSENGER TIRE HAVING LOW ROLLING RESISTANCE WITH IMPROVED WET TRACTION AND TREADWEAR

(75) Inventors: Junling Zhao, Hudson, OH (US); Michael Stefan Skurich, Canton, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 966 days.

(21) Appl. No.: 12/956,870

(22) Filed: Nov. 30, 2010

(65) Prior Publication Data

US 2012/0132332 A1 May 31, 2012

Related U.S. Application Data

(63) Continuation of application No. 12/943,584, filed on Nov. 10, 2010, now abandoned.

(51) Int. Cl.
*B60C 11/00* (2006.01)

(52) U.S. Cl.
CPC ............... *B60C 11/00* (2013.01); *B60C 11/005* (2013.01)
USPC ..................................... 152/209.5; 152/209.8

(58) Field of Classification Search
CPC .............................. B60C 11/00; B60C 11/005
USPC ................. 152/209.5, 209.8, 209.9
See application file for complete search history.

(56) References Cited

U.S. PATENT DOCUMENTS

| | | | |
|---|---|---|---|
| 2,445,725 A | | 7/1948 | Walker |
| 4,381,810 A | * | 5/1983 | Cady et al. ................ 152/209.5 |
| 4,478,266 A | * | 10/1984 | Pierson et al. ............. 152/209.5 |
| 4,580,608 A | | 4/1986 | Rampl |
| 4,603,721 A | | 8/1986 | Kogure et al. |
| 6,247,512 B1 | | 6/2001 | Radulescu |
| 6,336,486 B1 | * | 1/2002 | Iwasaki et al. ............. 152/209.5 |
| 6,581,659 B1 | * | 6/2003 | Zanzig et al. ............. 152/209.5 |
| 6,866,734 B1 | | 3/2005 | Ridha |
| 6,959,743 B2 | | 11/2005 | Sandstrom |

(Continued)

FOREIGN PATENT DOCUMENTS

| | | |
|---|---|---|
| EP | 1184205 A2 * | 3/2002 |
| GB | 1255952 A | 12/1971 |

(Continued)

OTHER PUBLICATIONS

Machine translation for Europe 1,184,205 (no date).*

(Continued)

*Primary Examiner* — Steven D Maki
(74) *Attorney, Agent, or Firm* — Wood, Herron & Evans, LLP

(57) ABSTRACT

A tire having a tread includes an outer tread layer and an inner tread layer. The inner tread layer includes one of a first elastomeric compound and a second elastomeric compound. The outer tread layer includes the other of the first and second elastomeric compounds. The second elastomeric compound has a lower rolling resistance and greater resistance to treadwear than the first elastomeric compound. The inner tread layer increases in thickness across at least a widthwise portion of the outer tread layer with a maximum thickness of one of the inner tread layer and the outer tread layer occurring near at least one of a first shoulder and a second shoulder of the tread. As the tread wears, the inner tread layer defines a greater proportion of a running surface of the tread.

17 Claims, 6 Drawing Sheets

(56) References Cited

U.S. PATENT DOCUMENTS

| | | |
|---|---|---|
| 7,082,976 B2 | 8/2006 | Ishida |
| 2002/0069948 A1 | 6/2002 | Sentmanat |
| 2005/0039834 A1 | 2/2005 | Suzuki |
| 2005/0109436 A1* | 5/2005 | Bruant et al. .............. 152/209.1 |
| 2009/0308514 A1 | 12/2009 | Houjou et al. |
| 2010/0154949 A1* | 6/2010 | Nagai ........................ 152/209.5 |

FOREIGN PATENT DOCUMENTS

| | | | |
|---|---|---|---|
| JP | 02-162104 A | * | 6/1990 |
| JP | 2008-018912 A | * | 1/2008 |

OTHER PUBLICATIONS

Machine translation for Japan 2008-018912 (no date).*
Translation for Japan 02-162104 (no date).*
Chinese Patent Office, Office Action issued in Application No. 201110354508.8, mailed Feb. 28, 2014, 14 pp.
State Intellectual Property Office of the People'S Republic China, First Office Action issued in corresponding Chinese Patent Application No. 201110354508.8 and English-language translation thereof dated Feb. 28, 2014 (14 pages).
European Patent Office, Extended Search Report issued in coresponding International Patent Application No. 11188162.9 (May 9, 2014) (6 pages).

* cited by examiner

PASSENGER TIRE HAVING LOW ROLLING RESISTANCE WITH IMPROVED WET TRACTION AND TREADWEAR

CROSS REFERENCE TO RELATED APPLICATION

This application claims the benefit of and is a continuation application of U.S. patent application Ser. No. 12/943,584, filed on Nov. 10, 2010 now abandoned.

FIELD OF THE INVENTION

The present invention generally concerns pneumatic radial tires, and, more particularly, a radial tire for a passenger vehicle that maintains a low rolling resistance while having good wet traction and treadwear throughout the usable life of the tire.

BACKGROUND OF THE INVENTION

The primary purpose of the tread is to provide traction with the road surface. Sufficient traction is particularly important in inclement weather when the road surface is covered with precipitation. To maintain traction in less-than-ideal road conditions, the tread is most often designed with a tread pattern. The tread pattern consists of one or more grooves or channels in the surface of the tire. The grooves may divide the tread into regions, often referred to as "lugs." The grooves help the tread maintain traction with the road by allowing the tread to expel precipitation from between the lugs and the road surface. Traction is also dependent upon the composition of the tread. Compositions with good traction are known, but simply selecting a composition for improved traction can have negative repercussions on the other characteristics of the tire, as set forth below, such as the wear resistance and rolling resistance.

The rolling resistance of the tire influences the fuel efficiency of the vehicle. It is desirable to reduce the rolling resistance to increase fuel efficiency. Generally as a tire wears, its rolling resistance decreases because the mass of the tire decreases. Like traction, rolling resistance is also dependent upon the composition of the tire. However, while compounds having low rolling resistance are desirable for improved fuel efficiency, those same compounds often do not provide the necessary minimum traction. The reverse is also true. That is, a compound with good traction properties typically exhibits an unacceptably high level of rolling resistance.

In addition, another characteristic of the tread is its wear resistance. The useable life of a tire is generally determined by the number of miles that can be driven on the tire before the tire tread becomes unacceptably thin, which is dictated by safety concerns. For this reason and others, it is desirable for the tread to resist wear. The compound from which the tread is made also determines the resistance of the tire to wear. However, similar to the competing characteristics between rolling resistance and traction characteristics of the tread, set forth above, compounds that are ideal for reducing treadwear typically exhibit poor traction.

To complicate matters, the rolling resistance and traction of a tire tread change as the tread inevitably wears away—there is a dynamic relationship between these characteristics. For instance, the rolling resistance of the tire generally decreases as the tread wears simply because of the simultaneous reduction in the weight of the tread. Furthermore, when the tread wears away or thins, the volume of the tread pattern is reduced. Since the tread pattern is primarily responsible for allowing the tread to maintain traction on wet or snow covered roads, reduction in the thickness of the tread, and the consequential loss in the void volume and siping depth of the tread pattern, reduces the traction of the tread in these circumstances. Therefore, where rolling resistance generally decreases, which is a desirable trend, the traction of the tread in inclement weather also decreases, which is an undesirable trend.

As a result, it is common practice to construct a tread of a compound that is essentially a tradeoff between traction, rolling resistance, and treadwear. The application for the tire may dictate whether any one of these characteristics is to be emphasized. However, where one of the characteristics is emphasized, the remaining characteristics of the tire can be less than optimum.

Therefore, there remains a need for tire treads that exhibit desirable combinations of traction, rolling resistance, and treadwear characteristics that can be maintained throughout the useable life of the tire.

SUMMARY OF THE INVENTION

The present invention is directed to a pneumatic tire that maintains a low rolling resistance while having good wet traction and treadwear throughout the usable life of the tire.

In one embodiment, the pneumatic tire includes an outer circumferential tread having an outer tread layer in direct and continuous contact with an inner tread layer. The outer and inner tread layers together define the thickness of the tread. The inner tread layer includes one of a first elastomeric compound or a second elastomeric compound, and the outer tread layer includes the other of the first elastomeric compound or the second elastomeric compound. The second elastomeric compound having lower rolling resistance and greater resistance to treadwear than the first elastomeric compound. The inner tread layer increases in thickness across at least a widthwise portion of the outer tread layer. A maximum thickness of one of the inner tread layer and the outer tread layer is near at least one of a first shoulder and a second shoulder of the tread. As the tread wears, the inner tread layer defines a greater proportion of a running surface of the tread.

In another embodiment, an outer circumferential tread has an outer tread layer in direct and continuous contact with an inner tread layer. The outer and inner tread layers together define the tread thickness. A tread pattern that has tire grooves extends through the outer tread layer and into the inner tread layer. The valleys of the tire grooves are devoid of the outer tread layer. The inner tread layer has a maximum thickness near a central region of the tread and includes a first elastomeric compound. The outer tread layer includes a second elastomeric compound having lower rolling resistance and greater resistance to treadwear than the first elastomeric compound. The outer tread layer increases in thickness across at least a widthwise portion of the outer tread layer from near the central region of the tread to a maximum thickness near at least one of a first shoulder and a second shoulder of the tread to provide longer lasting wear resistance for the tire at the at least one shoulder. As the tread wears, the inner tread layer defines a greater proportion of a running surface of the tread.

BRIEF DESCRIPTION OF THE DRAWINGS

The invention will be described by way of example and with reference to the accompanying drawings in which.

DETAILED DESCRIPTION

Figure 1:
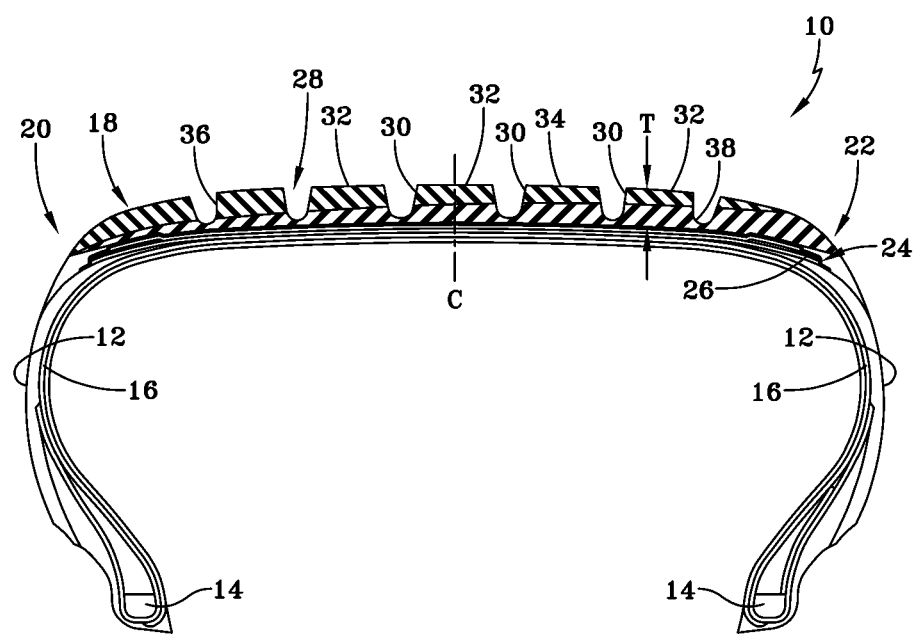
FIG. 1 is a cross-sectional view of a tire with a tire tread constructed according to an embodiment of the invention.

With reference generally to FIGS. 1-5, there is shown a pneumatic tire 10 that includes sidewalls 12, inextensible beads 14, a supporting carcass 16, and an outer circumferential tread 18. The individual sidewalls 12 extend radially inward from the axial outer edges or shoulders 20, 22 of the tread 18 to join the respective inextensible beads 14. The opposing shoulders 20, 22 define the width of the tread 18 and join the respective sidewall 12 with the tread 18. The supporting carcass 16 may include a reinforcing structure 24 that further includes a belt structure 26 disposed outwardly of the supporting carcass 16. An innerliner (not shown) may line the interior of the supporting carcass 16 to inhibit the passage of air or other gases from within the tire 10 over prolonged periods. The outer circumferential tread 18 is adapted to contact the road during use of the tire 10. And, in that regard, the outer circumferential tread 18 provides a combination of traction, rolling resistance, and treadwear characteristics that are maintained throughout the useable life of the tire.

To that end and with reference to FIG. 1, the outer circumferential tread 18 includes a matrix or tread pattern 28 comprising one or more grooves 30 that define lugs or tread elements 32 therebetween. The tread elements 32 collectively define the contact or running surface 34 of the tread 18 during use of the tire 10. The grooves 30 form voids between the adjacent tread elements 32 when the elements 32 are in contact with the road surface. The voids provide a collection point for escape of material, for example, water, from between the elements 32 and the road surface thereby improving contact, and thus traction, between the tire 10 and the road. Absent the grooves 30, the tire 10 would be more likely to hydroplane when driven through water. However, it will be appreciated that the benefit of grooves 30 may lessen as the tread 18 wears. As will be described in more detail below, the composition of the running surface 34 of the tread 18 changes as the tread 18 wears such that the tread 18 exhibits less variation in the performance over the life of the tire 10. Furthermore, the compositional changes are location specific. Thus, the composition of the tread 18 varies by region of the running surface 34.

In this regard, the outer circumferential tread 18 includes two or more layers arranged to cause variation in their exposure as the tread 18 wears. In one embodiment and with reference to FIG. 1, the tread 18 includes an outer tread layer 36 and an inner tread layer 38. As shown, the outer tread layer 36 resides at a generally greater radial distance from the axis of rotation (not shown) of the tire 10 than the inner tread layer 38. Generally, of the outer and inner tread layers 36, 38, a larger proportion of the outer tread layer 36 wears away earlier in the life of the tread 18 than the inner tread layer 38 due to its relative radial position. The outer and inner tread layers 36, 38 may reside in direct and continuous contact with one another such that together they define the tread thickness, T, when the tire 10 is new. The outer and inner tread layers 36, 38 may be well-defined layers having an identifiable change in composition across an interface between the two, as set out below. Alternatively, the outer and inner tread layers 36, 38 may be formed by extruding multiple compositions simultaneously thereby forming a gradient in composition between the outer and inner layers 36, 38. As such, the interface between the outer and inner layers 36, 38 may not be well defined.

With continuing reference to FIG. 1, when the tire 10 is new, the thickness, T, of the tread 18 may be defined by the combined thickness of the outer tread layer 36 and the inner tread layer 38. The depth of the grooves 30 may be less than the thickness T of the tread 18. As such, the grooves 30 may extend through the outer tread layer 36, but only partially into the inner tread layer 38. The valleys of the grooves, which is the deepest extent of the grooves 30, may, therefore, be devoid of the outer tread layer 38. The outer tread layer 36 may, therefore, be discontinuous or broken between elements 32 by the grooves 30. And, the inner tread layer 38 may be exposed in the grooves 30 but the inner tread layer 38 may be continuous across the width of the tread 18. It will be appreciated, however, that the embodiments of the invention are not so limited. For example, when the thickness of the outer tread layer 36 is approximately equal to the thickness T of the tread 18, the grooves 30 may not extend through the outer tread layer 36. A portion of the outer tread layer 36 would thus be left intact between adjacent tread elements 32. However, because of variation in thickness, described below, the groove 30 may extend through the outer tread layer 36 at another widthwise location such that the inner tread layer 38 is exposed at or near the valley portion of at least one groove 30 in the tread 18. In addition, although not shown, an undertread layer may reside between the reinforcing structure 24 and the tread 18, for example, directly between the inner tread layer 38 and structure 24 and may be formed of a similar compound as the outer or inner tread layers 36, 38.

In addition to the difference in radial placement, the inner tread layer 38 is made of a different elastomeric compound than the outer tread layer 36. Unless otherwise referred to herein, the inner tread layer 38 may be made of a first elastomeric compound, and the outer tread layer 36 may be made of a second elastomeric compound. While each of the first and second elastomeric compounds are described in more detail below, in one embodiment, the second elastomeric compound may have a lower rolling resistance and a greater resistance to wear than the first elastomeric compound. Alternatively, or in addition thereto, the first elastomeric compound may have a greater wet traction than the second elastomeric compound.

According to embodiments of the invention, the combination of compound properties and arrangement of the tread layers 36, 38 provide the tread 18 with a level of rolling resistance, wet traction, and wear resistance that may be maintained during the life of the tire 10. Overall variation of one or more of these properties over the life of the tire 10 may be less as compared to that which is observed by a tread made of a monolith of homogenous material or a tread made of uniform layers. For example, when a tread is homogenous, the wear resistance, wet traction, and rolling resistance may vary throughout the life of a tire, and in some instances the variation is significant. Specifically, if the tread on a tire is homogenous and is between 0.35 and 0.60 inches thick, the variation in the rolling resistance over the life of the tread may be from 20% to 40%. That is, the rolling resistance may decrease by as much as 40% from the new condition to near the time that the tread is worn out. Similarly, the wet traction characteristic of the tread may vary significantly. For example, hydroplaning may be more probable as the tread wears, possibly increasing in frequency by 40 to 60%. Wet traction, as measured by breaking distance on a wet surface, may be reduced by 10 to 30% over the life of a homogenous tread. The vehicle thus requires an increase in distance to come to a stop as the tread thins. The life expectancy of a homogenous tread may be in the range of 20,000 to 80,000 miles. It will be appreciated that the variation in the above characteristics of a homogenous tread may depend on the tire size, its construction, the tread pattern, the tread compound, and variation in testing procedures.

In one embodiment and with reference to FIG. 1, when the tread 18 is new or near new, the outer and inner tread layers 36, 38 are not of uniform thickness either individually or with respect to the other layer in a widthwise region of the tread 18. In this respect, the thickness of each of the outer and inner tread layers 36, 38 may be described as one of a continuously increasing, or continuously decreasing, nature in the widthwise region. As set forth herein, the widthwise region extends over more than one tread element 32. For example, the widthwise region may extend across two tread elements 32, across a majority of the tread 18, or nearly the full width of the tread 18.

In particular, in one embodiment and with reference to FIG. 1, due to the continuous thickness variation, the thickness of the inner tread layer 38 may not be the same at any two locations along the widthwise region. By way of example, the variation in the thickness of the inner tread layer 38 from its maximum thickness to its minimum thickness in the widthwise region may be of a continuously increasing relationship. As shown in FIG. 1, the continuous increase in the thickness of the inner tread layer 38 may be approximately linear. Similarly, the thickness of the outer tread layer 36 also continuously varies in the widthwise region. In embodiments of the invention in which the outer tread layer 36 complements the variation in the thickness of the inner tread layer 38 to form the tread 18 having a uniform thickness, the outer tread layer 36 may also vary linearly in thickness across the widthwise region, though in a decreasing manner.

As introduced above, there may be no relationship between the thickness of the outer tread layer 36 and thickness of the inner tread layer 38, except that at any particular location in the widthwise region, the two thicknesses may define the thickness T of the tread 18 at that location. As such, the outer tread layer 36 may be substantially thicker than the inner tread layer 38 at all points across the widthwise region. Alternatively, the inner tread layer 38 may be substantially thicker than the outer tread layer 36 at all locations along the widthwise region. It will be appreciated that the relative thickness of the layers 36, 38 may depend on the depth of the grooves 30 and the compositions of the outer and inner tread layers 36, 38, among other factors. In one embodiment, however, the maximum thickness of the outer tread layer 36 may nearly coincide with the minimum thickness of the inner tread layer 38. While the maximum thickness of each of the outer and inner tread layers 36, 38 are shown as being approximately equal, the embodiments of the invention are not so limited, as set out above.

With continuing reference to FIG. 1, the widthwise region extends from near one shoulder 20 to near the other shoulder 22. The maximum thickness of the outer tread layer 36 occurs near the shoulder 20 and the maximum thickness of the inner tread layer 38 occurs near the opposing shoulder 22. To that end, the respective minimum thicknesses of the outer and inner tread layers 36, 38 occur at shoulder 22 and shoulder 20, respectively. The inner tread layer 38 continuously increases, and the outer tread layer 36 continuously decreases, in thickness from the minimum thickness to the maximum thickness between the shoulders 20, 22. As shown, the variation in thickness is approximately linear for the outer and inner tread layers 36, 38 between the shoulders 20, 22. Although not shown, it will be appreciated that the thickness of the inner tread layer 38 may decrease, rather than increase, from shoulder 20 to shoulder 22 with the outer tread layer 36 increasing rather than decreasing. It will also be appreciated that while a linear relationship or an approximation thereof is shown and described, the relative thickness variation between the outer and inner tread layers 36, 38 may be represented by another mathematical expression, such as, a quadratic relationship, and still maintain a continuously increasing, or decreasing, thickness relationship.

Figure 2:
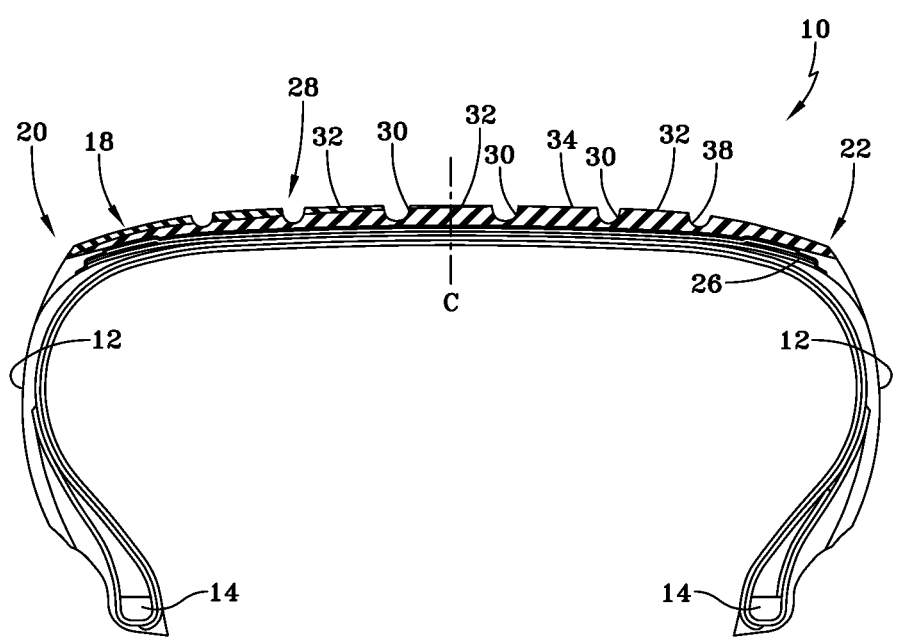
FIG. 2 is a cross-sectional view of the tire of FIG. 1 showing a partially worn tread.

As a result of the tread configuration shown in FIG. 1, as the tread 18 wears, portions of both of the tread layers 36, 38 are removed. By this configuration, a continuously increasing proportion of the inner tread layer 38, and a continuously decreasing proportion of the outer tread layer 36, forms the running surface 34 along the width of the tread 18. With reference now to FIGS. 1 and 2, since the outer tread layer 36 is made of the second elastomeric compound, i.e., a compound that is more resistant to wear and has a lower rolling resistance than the compound of the inner tread layer 38, the outer tread layer 18 lasts longer than a tread made of a homogenous material having greater wet traction than the second elastomeric compound. Thus, to wear the tread 18 from the new or near new condition of FIG. 1 to the partially worn condition of FIG. 2 may take longer than it would for such a homogenous material. Further, in one embodiment, the thickness of the outer tread layer 36 can be increased at locations subject to high wear or loading that would likely accelerate treadwear.

At some time during the life of the tire 10, the tread 18 is worn to the condition shown in FIG. 2. As shown, the inner tread layer 38 may form the running surface 34 from the shoulder 22 to about the midpoint of the tread width. The inner tread layer 38 therefore forms a continuous portion of the running surface 34 from the shoulder 22 to the location on the running surface 34 where the outer tread layer 36 remains. Because the first elastomeric compound exhibits improved wet traction versus the second elastomeric compound, the tread 18 exhibits improved wet traction in the region including the shoulder 22 versus the second elastomeric compound. The tread 18 also exhibits resistance to treadwear and lower rolling resistance because the outer tread layer 36 is exposed in the region of the tread that includes the shoulder 20. Thus, as the tread 18 wears from the condition of FIG. 1 to the condition of FIG. 2, the influence of the properties of the first elastomeric compound on the tread 18 performance increases and may be generally proportional to the gradual increase in the exposed surface area of the first elastomeric compound along the running surface 34. Similarly, the influence of the properties of the second elastomeric compound on the tread 18 gradually decreases because the surface area of the outer tread layer 36 decreases as a proportion of the running surface 34 also decreases. Thus, by the continuously increasing or decreasing thickness relationship, the overall tread properties change as the tread 18 wears. The tire 10 may thus be characterized by decreased rolling resistance and improved wear resistance initially with a gradual shift to improved wet traction as the tread wears. Further, the gradual shift is predetermined according to the thickness relationship between the outer and inner tread layers 36, 38. It will be appreciated that the continuous thickness variation and composition of each of the outer and inner tread layers 36, 38 may be adjusted to obtain a predetermined balance between rolling resistance, wet traction, and wear resistance not observed in homogenous treads or in uniformly layered treads at similar periods during the life of the tire 10, as set forth above.

Figure 3:
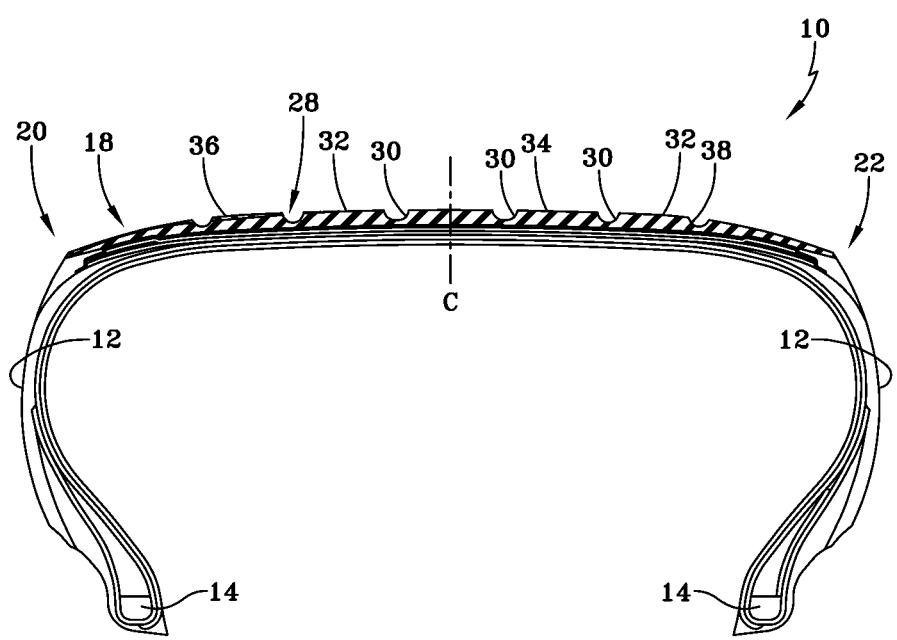
FIG. 3 is a cross-sectional view of the tire of FIG. 2 following additional wear of the tread.

With reference to FIG. 3, after the tread 18 is further worn, in which case the running surface 34 of the tread 10 may approach at least one of the deepest or valley portions of the grooves 30, the inner tread layer 38 forms a majority of the running surface 34, possibly leaving only a small portion of the outer tread layer 36 near the shoulder 20. However, it will be appreciated that over the life of the tire 10, the outer tread layer 36 may be completely removed with only the inner tread layer 38 remaining, such as, up to a point that is slightly less than the depth of the grooves 30. The reinforcing structure 24 may, thus, never contact the road surface during use of the tire 10.

Advantageously, the tire 10 with the new configuration shown in FIG. 1 and wear pattern shown in FIGS. 2 and 3 may be constructed with the maximum thickness of the outer tread layer 36 positioned at a location of greatest wear or deformation to improve the endurance or life of the tire 10. In addition, the continuous change in thickness relation between the outer and inner tread layers 36, 38 may provide a predetermined, graduated offset of the loss in volume of the grooves 30 with improvement in the wet traction provided by the inner tread layer 38. The relationship of the outer and inner tread layers 36, 38 may be such that the rate of exposure of the inner tread layer 38 substantially compensates for a reduction in the volume of the tire grooves 30 continuously over the life of the tire 10. The thickness relationship of the outer and inner tread layers 36, 38 may also be configured to maintain a minimal rolling resistance of the tread 18 while maintaining the wet traction of the tread 18 near the level observed in the "new" condition. The minimal rolling resistance is that which provides acceptable fuel efficiency. It will be appreciated that the continuous thickness variation over the particular widthwise region between the outer and inner tread layers 36, 38 may be adjusted such that the outer tread layer 36 may wear away sooner or later during the life of the tire 10. The timing of any complete removal of the outer tread layer 36 may be predetermined and may depend upon the compositions of the first and second elastomeric compounds, the thickness of the tread 18, and the depth of the grooves 30, among other factors.

Figure 4:
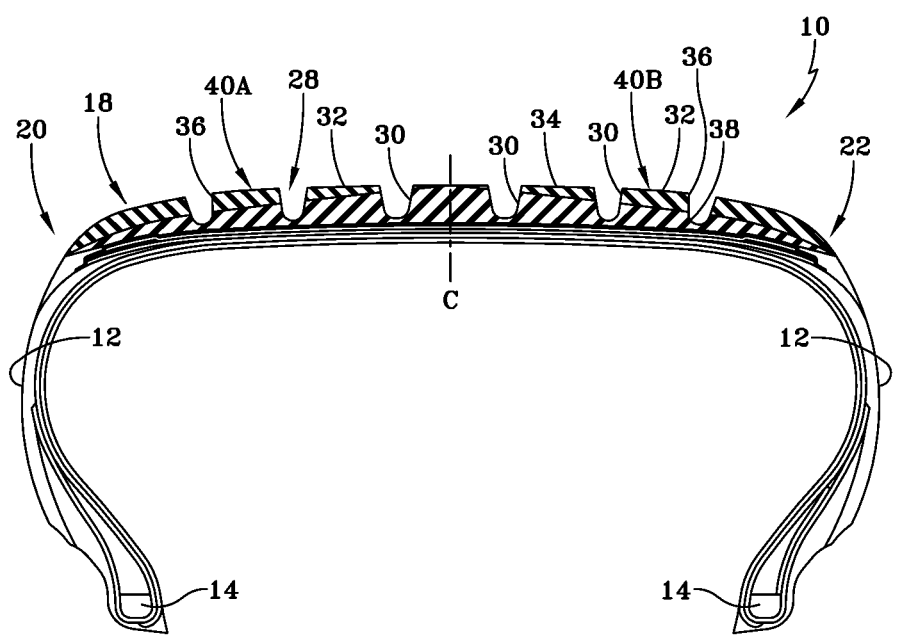
FIG. 4 is a cross-sectional view of a tire with a tire tread constructed according to another embodiment of the invention.

With reference now to FIG. 4, in another embodiment of the present invention, the continuous thickness variation between layers 36, 38 and compositional differences thereof may extend over two widthwise regions (40A and 40B) of the tread 18. As with the embodiments described above, the widthwise regions 40A, 40B may include more than one tread element 32. The widthwise regions 40A, 40B may be approximately the same overall width, or they may be of different overall widths. One region 40A may be between the shoulder 20 and central region or the centerline (C) of the tread 18, and the other region 40B may be between the centerline (C) of the tread 18 and the shoulder 22. By way of example only, the two regions 40A, 40B may be arranged symmetrically on either side of the centerline (C), as shown. Thus, the outer and inner tread layers 36, 38 may be arranged nearly symmetrically with respect to the centerline (C) of the tread 18. It will be appreciated that while two widthwise regions 40A, 40B of the tread 18 are shown and described herein, multiple widthwise regions may be formed in accordance with the embodiments of the invention shown and described herein.

With continuing reference to FIG. 4, the widthwise regions 40A, 40B extend from the shoulder 20 to the centerline (C) of the tread width and from the centerline (C) to the shoulder 22. Thus, the two regions 40A, 40B essentially extend the full width of the tread 18. A maximum thickness of the inner tread layer 38 may be located near the centerline (C) of the tread 18. As such, the inner tread layer 38 may continuously increase in thickness from near the shoulder 20 to the centerline (C) of the tread 18 and then continuously decreases in thickness from centerline (C) of the tread 18 to the shoulder 22. The individual thicknesses of the outer and inner tread layers 36, 38 may be unrelated. The thickness variation of the inner tread layer 38 shown is approximately linear across each region 40A, 40B. Thus, the thickness of the inner tread layer 38 varies linearly with respect to the widthwise location within the respective widthwise region 40A, 40B. Where the tread 18 is of a uniform thickness, the outer tread layer 36 varies in thickness such that it complements the thickness variation of the inner tread layer 38. The outer tread layer 36 gradually decreases from the shoulder 20 to the centerline (C) and then increases in thickness from the centerline (C) to the shoulder 22. By way of example, the outer tread layer 36 may vary linearly across both widthwise regions 40A, 40B. It will be appreciated that while a linear relationship or an approximation thereof is shown and described, the relative thickness variation between the outer and inner tread layers 36, 38 may be represented by other mathematical expressions and still maintain a continuously increasing, or decreasing, thickness relationship. The combined thicknesses of the outer and inner tread layers 36, 38 may thus represent the thickness of the tread 18 at any widthwise location on the tread 18. It will be appreciated that the invention is not limited to having a uniformly thick tread. Furthermore, while the linear relationships shown are similar in each respective widthwise region 40A, 40B, embodiments of the present invention are not limited to similar linear relationships between the two regions 40A, 40B. It will be appreciated that one region may be a linear relationship while the second or other widthwise regions may be a nonlinear, though of a continuously increasing or decreasing thickness nature.

Similar to the embodiments of the tire 10 shown in FIGS. 1-3, the inner tread layer 38 of FIG. 4 may be made of the first elastomeric compound and the outer tread layer 36 may be made of the second elastomeric compound. The second elastomeric compound may have a greater wear resistance and a lower rolling resistance than the first elastomeric compound. Alternatively or in addition thereto, the first elastomeric compound may have a greater wet traction than the second elastomeric compound. However, where an alternative wear pattern or a change in wet traction and/or rolling resistance is desirable to address a particular tire configuration, the inner tread layer 38 in FIGS. 1 and 4 may be made of the second elastomeric compound and the outer tread layer 36 may be made of the first elastomeric compound.

During wear of the tread 18 having the configuration shown in FIG. 4, the outer tread layer 36 in the central region of the tread 18 may initially wear away, though it forms a portion of the tread 18 at each shoulder 20, 22, exposing the inner tread layer 38 in the central region. Thus, in embodiments in which the second elastomeric compound has a greater wear resistance and lower rolling resistance than the first elastomeric compound, the tire 10 exhibits longer life versus a tread made of a homogenous compound having a greater wet traction. In addition, in one embodiment, when the first elastomeric compound has a greater wet traction than the second elastomeric compound, the inner tread layer 38 in the central region may initially compensate for the loss of the depth of the grooves 30 in the central region. It will be appreciated that in one embodiment in which the two widthwise regions are not arranged symmetrically, exposure of the inner tread layer 38 may also not be symmetrical with respect to the centerline or midpoint of the tread 18. An asymmetrical exposure of the inner tread layer 38 with respect to the centerline of the tread 18 may compensate for known asymmetrical loading on the tread 18 or another characteristic of the tire 10.

Figure 5:
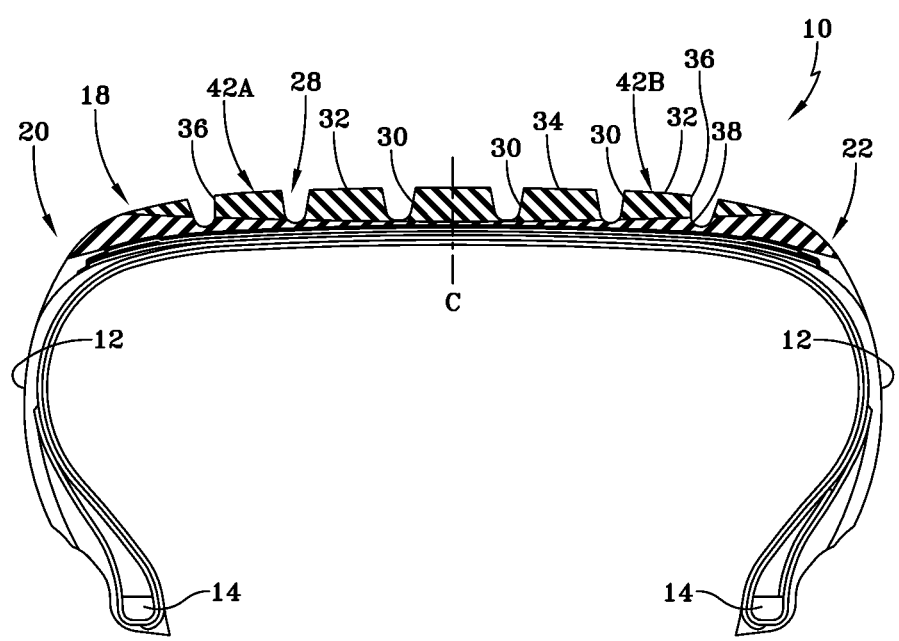
FIG. 5 is a cross-sectional view of a tire with a tire tread constructed according to another embodiment of the invention.

With reference now to FIG. 5, in another embodiment of the present invention, the continuous thickness variation between layers 36, 38 and compositional differences thereof may extend over two widthwise regions 42A and 42B of the tread 18. Similar to the embodiment shown in FIG. 4, the widthwise regions 42A, 42B of FIG. 5 define the total width of the tread 18 and may include more than one tread element 32. The widthwise regions 42A, 42B may be approximately the same overall width, or they may be different overall widths. One region 42A may be between the shoulder 20 and central region or the centerline (C) of the tread 18, and the other region 42B may be between the centerline (C) of the tread 18 and the shoulder 22. By way of example only, the two regions 42A, 42B may be arranged symmetrically on either side of the centerline (C), as shown. Thus, the outer and inner tread layers 36, 38 may be arranged nearly symmetrically with respect to the centerline (C) of the tread 18. It will be appreciated that while two widthwise regions 42A, 42B of the tread 18 are shown and described herein, multiple widthwise regions may be formed in accordance with the embodiments of the invention shown and described herein.

With continuing reference to FIG. 5, the widthwise regions 42A, 42B extend from the shoulder 20 to the centerline (C) of the tread width and from the centerline (C) to the shoulder 22, respectively. Thus, the two regions 42A, 42B arranged end-to-end essentially extend the full width of the tread 18. In contrast to the embodiment of the tread 18 shown in FIG. 4, a maximum thickness of the inner tread layer 38 of FIG. 5 may be located near one or both of the shoulders 20, 22 of the tread 18. As such, the inner tread layer 38 may continuously decrease in thickness from near the shoulder 20 to the centerline (C) of the tread 18 and then continuously increases in thickness from centerline (C) of the tread 18 to the shoulder 22. The individual thicknesses of the outer and inner tread layers 36, 38 may be unrelated. The thickness variation of the inner tread layer 38 shown is approximately linear across each region 42A, 42B. Thus, the thickness of the inner tread layer 38 varies linearly with respect to the widthwise location within the respective widthwise region 42A, 42B. Where the tread 18 is of a uniform thickness, the outer tread layer 36 varies in thickness such that it complements the thickness variation of the inner tread layer 38. The outer tread layer 36 gradually increases in thickness from the shoulder 20 to the centerline (C) and then decreases in thickness from the centerline (C) to the shoulder 22. By way of example, the outer tread layer 36 may vary linearly across both widthwise regions 42A, 42B. It will be appreciated that while a linear relationship or an approximation thereof is shown and described, the relative thickness variation between the outer and inner tread layers 36, 38 may be represented by other mathematical expressions and still maintain a continuously increasing, or decreasing, thickness relationship. The combined thicknesses of the outer and inner tread layers 36, 38 may thus represent the thickness of the tread 18 at any widthwise location on the tread 18. It will be appreciated that the invention is not limited to having a uniformly thick tread. Furthermore, while the linear relationships shown are similar in each respective widthwise region 42A, 42B, embodiments of the present invention are not limited to similar linear relationships between the two regions 42A, 42B. It will be appreciated that one region may have a linear relationship while the second or other widthwise regions may be nonlinear in nature, though of a continuously increasing or decreasing thickness.

In addition, it will be appreciated that the two widthwise regions 42A, 42B may not be arranged symmetrically with respect to the centerline (C). Thus, exposure of the inner tread layer 38 may also not be symmetrical with respect to the centerline or midpoint of the tread 18. An asymmetrical exposure of the inner tread layer 38 with respect to the centerline of the tread 18 may compensate for known asymmetrical loading on the tread 18 or another characteristic of the tire 10.

As with the exemplary embodiments of the invention shown in FIGS. 1 and 4, the inner tread layer 38 of FIG. 5 may be made of the first elastomeric compound and the outer tread layer 36 may be made of the second elastomeric compound. Alternatively, the inner tread layer 38 may be made of the second elastomeric compound and the outer tread layer 36 may be made of the first elastomeric compound. The selection of the compounds for either of the layers 36, 38 may depend upon various factors including the type of tire and the desired performance characteristics, among others.

The composition of the compounds together with the continuous variation in thickness between the outer and inner tread layers 36, 38 provides improved wear resistance and wet traction over the life of the tire 10. As introduced above, the second elastomeric compound may have a greater wear resistance and/or lower rolling resistance than the first elastomeric compound. In addition, or alternatively, the first elastomeric compound may have a greater wet traction than the second elastomeric compound. A greater wear resistance generally means that a given thickness of the compound thins at a lower rate than a compound having a relatively lower wear resistance. And, a lower rolling resistance generally means that less energy is required to roll a given tread over a given distance than another compound. The wet traction is representative of a coefficient of friction in contact with a road surface when that surface is wet. A compound with a relatively high wet traction has a relatively high coefficient of friction and thus is not as likely to slide when in contact with the wet surface when all other factors remain the same. This is particularly relevant during braking.

Generally, the second elastomeric compound may be positioned to reduce the rate of treadwear. And, the first elastomeric compound may be positioned to compensate for the loss in traction that is the result of the reduction in the depth of the grooves 30 in the tread 18 as the tread 18 wears. By such a construction, wear of the tread first removes the outer tread layer 36 of the second elastomeric compound, thereby exposing the inner tread layer 38 of the first elastomeric compound, which compensates for the loss in wet traction due to treadwear. It is also contemplated that the outer and inner tread layer 36, 38 may alternatively be made of the first and second elastomeric compounds, respectively. The alternative arrangement of the outer and inner tread layers 36, 38 and compounds may be made to achieve a particular performance improvement not possible with a tire having a tread made of a homogenous compound.

The material properties of a particular elastomeric compound may be indicative of the compound's wet traction, rolling resistance, and wear resistance. Generally, in addition to the glass transition temperature or $T_g$, material properties that provide some indication of wet traction and rolling resistance include measurements of rebound and tan delta ($\delta$). The material property that indicates the resistance of the tread to tread wear includes the measurement of the Grosch abrasion resistance or rate.

Tan δ is a ratio of dynamic loss modulus, G", to dynamic storage modulus, G', and is dependent on the temperature of the compound during measurement. Tan δ is a ratio of the viscous response to the elastic response and is a measure of hysteresis. As such, tan δ may be proportional to the energy loss generated under conditions of constant energy input. A lower hysteresis, as indicated by a relatively small tan δ value, is typically indicative of lower energy loss and less heat generation when the compound is cyclically loaded. The lower the hysteresis energy loss is, or the smaller value of the tan δ is, the lower the rolling resistance. A relatively high value of tan δ is indicative of a better wet traction.

Figure 6:
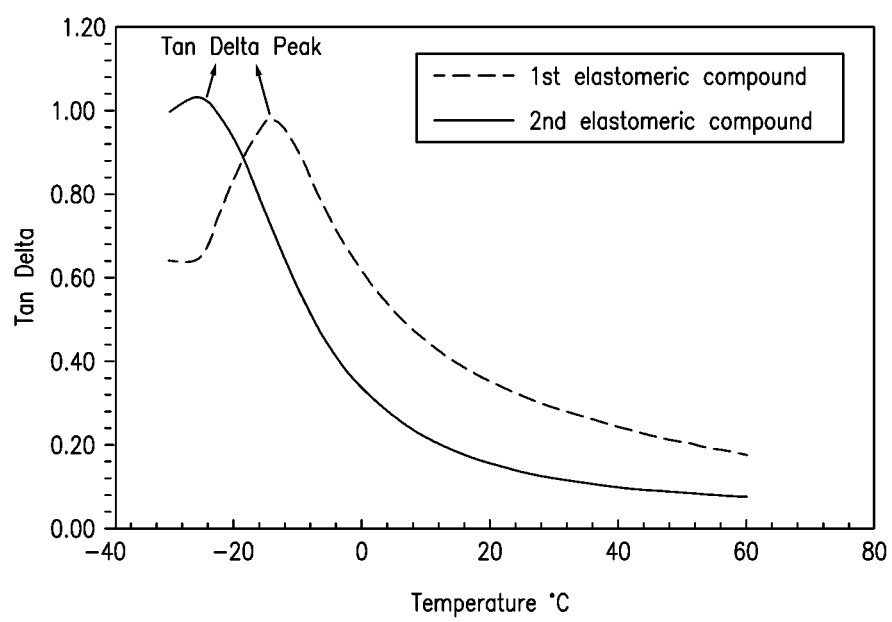
FIG. 6 is a graphical representation of a relationship between temperature and tan delta (δ) for two different elastomeric compounds according to one embodiment of the invention.

While the value of tan δ is dependent on the composition, it is also dependent on temperature as shown in FIG. 6. With reference to FIG. 6, typically, the relationship between the values of tan δ and temperature result in one or more peaks or maximums in the values of tan δ at a particular temperature (labeled "Tan delta peak" in FIG. 6). The peak in tan δ generally represents the maximum absorption of energy of the compound at a constant loading frequency. The differences in properties between the compounds may be indicated by a difference between the temperatures at which the peak in the tan δ occurs. By way of example, the first elastomeric compound may be a blend of about 75 parts of high styrene SSBR to about 25 parts BR with resins, and the second elastomeric compound may be a blend of about 70 parts low styrene SSBR to about 30 parts BR without resins. In this case, the first elastomeric compound may have a peak in the temperature versus tan δ plot that occurs at a higher temperature than a peak in the temperature plot versus tan δ of the second elastomeric compound.

Rather than measuring tan δ across a large range of temperatures, tan δ may be measured according to industry standards, such as, ASTM D5992, at specific measurement temperatures. Usually, these temperatures are 0°, 60°, 90°, and 100° C. It is believed that a relatively low value of tan δ at about 60° C. is an indication of better rolling resistance. It is also believed that a relatively high value of tan δ at about 0° C. is an indication of a better wet traction. By way of example, the first elastomeric compound may have a tan δ value at around 0° C. that is greater than a corresponding tan δ value of the second elastomeric compound, and thus the first elastomeric compound may have a better wet traction than the second elastomeric compound. By way of additional example, the second elastomeric compound may have a tan δ value at around 60° C. that is less than the first elastomeric compound at the same temperature, and thus the second elastomeric compound may have a better rolling resistance than the first elastomeric compound. In one embodiment, the tan δ values for the first elastomeric compound are greater than the tan δ values for the second elastomeric compound at all temperatures greater than 0° C.

Rebound is also a measure of hysteresis of the compound when subject to loading, though rebound is measured by ASTM D1054. Generally, the lower the measured rebound at 0° C., the greater the wet traction. The higher the measured rebound at 60° C., the lower the rolling resistance.

The resistance to abrasion for the compounds may be evaluated by measuring the Grosch abrasion rate. A lower Grosch abrasion rate indicates a more wear resistant compound. To measure the Grosch abrasion rate, a sample of the compound is placed at a slip angle under constant load as it traverses a given distance on a rotating abrasive disk (from HB Schleifmittel GmbH). Frictional forces, both lateral and circumferential, generated by the abrading sample can be measured together with the load using a custom tri-axial load cell. The surface temperature of the abrading wheel is monitored during testing and is reported as an average temperature.

The Grosch abrasion rate test may be run on a LAT-100 abrader and is measured in terms of mg/km of material abraded away. The compound may be subject to three levels of abrasion severity (low, medium, and high). In a low severity test, the sample is loaded with 20 Newtons at a slip angle of 2° on the disk, which is run at a speed of 20 or 40 kilometers per hour (kph) for a distance of 7,500 meters. According to the medium severity test, a load of 40 Newtons is used on the sample oriented at a slip angle of 6°. The disk speed is 20 kph and the sample travel distance is 1,000 meters. A high abrasion severity test may be run at a load of 70 Newtons at a slip angle of 12°, a disk speed of 20 kilometers per hour, and a sample travel distance of 250 m. In one embodiment, the measured Grosch abrasion rate of the second elastomeric compound is less than the measured Grosch abrasion rate of the first elastomeric compound.

Another material property that may be used as an indicator of the performance of the compounds is the glass transition temperature or $T_g$ of the compound. The glass transition temperature may be defined as the temperature above which the compound behaves in an elastic or rubbery manner rather than in a glassy or brittle manner. Where the compound is composed of two or more immiscible materials, each of those materials may exhibit a $T_g$ such that the compound may have multiple glass transition temperatures, one for each phase in the compound. In one embodiment, the first elastomeric compound has a $T_g$ that is greater than the $T_g$ of the second elastomeric compound. By way of example, the $T_g$ of the first elastomeric compound may be in the range of about $-10°$ C. to about $-40°$ C., and the $T_g$ of the second elastomeric compound may be in the range of about $-30°$ C. to about $-60°$ C.

Fillers may be added to one or both of the first and second elastomeric compositions to change the respective properties thereof. However, while addition of a filler to the compound may increase a desired characteristic, such as wet traction, the addition may also cause deterioration of another characteristic, such as the rolling resistance. According to one embodiment, silica may be added to the compound to improve the wet traction of the compound. However, addition of silica may also increase the rolling resistance. High levels of silica may be one component of the first elastomeric compound. In another embodiment, the first and second elastomeric compositions may include silica but differ in silica content. The first elastomeric composition may have a higher silica content than the silica content of the second elastomeric composition.

By way of example, the first elastomeric composition may include from about 70 phr to about 110 phr silica, and the second elastomeric composition may include less than 70 phr silica. By way of further example, the second elastomeric composition may include an amount of silica in the range of about 50 phr to about 70 phr silica, and the first elastomeric composition may include an amount of silica in an amount greater than 70 phr silica. It will be appreciated, however, that as little as 40 phr silica is possible in the second elastomeric composition when silica is included therein. It will also be appreciated that other fillers, such as, carbon black, may be used in the composition to cause a difference in the wet traction characteristic between the first and the second elastomeric compositions. In addition, one or both of the compositions may also include one or more filler components, which can include calcium carbonate, clay, mica, silicates, talc, titanium dioxide, starch and other organic fillers, such as wood flour.

In addition, to achieve a relative difference in temperature in the tan δ peak, resins may be added to one or both of the first and second elastomeric compounds to change the respective properties thereof. However, while addition of resins to the compound may increase a desired characteristic, such as wet traction, the addition may also cause deterioration of another characteristic, such as the rolling resistance and treadwear. The reverse may also be true, i.e., addition of resins may also increase the rolling resistance and decrease treadwear resistance. In one embodiment, the first elastomeric compound may contain relatively high percentages of resins. In another embodiment, the first and second elastomeric compositions may include resins, but the resin composition may differ. In one embodiment, the first elastomeric composition may include from about 5 phr to about 20 phr resins, and the second elastomeric composition may include up to about 10 phr resins.

It will be appreciated that there are a wide variety of polymers and resins that may be used in the manufacture of the outer and inner tread layers 36, 38 to obtain a relative difference in $T_g$ or difference in temperature between locations of the peak in the tan δ curve, as described herein. It will also be appreciated that numerous additional additives are known in the art and may also be added to provide a compound having desired physical properties. Such known and commonly used additive materials are activators, retarders and accelerators, rubber processing oils, resins including tackifying resins, plasticizers, fatty acids, zinc oxide, waxes, antidegradant, antiozonants, peptizing agents, and curatives. As is known to those having ordinary skill in the art, depending on the intended use of the tire 10, the additives are selected and used in conventional amounts.

According to one embodiment, the mixing of all of the components of the compositions for the tread 18 can be accomplished by methods known to those having ordinary skill in the art. For example, the ingredients can be mixed in at least two non-productive stages followed by a productive mix stage. The final curatives are typically mixed in the final stage, which is conventionally called the "productive" mix stage in which the mixing typically occurs at a temperature, or ultimate temperature, lower than the vulcanization temperature of the elastomer. The terms "non-productive" and "productive" mix stages are well known to those having skill in the runner mixing art. The layer 36 and/or layer 38 may be provided as a sheet that is formed, e.g., by extrusion casting. Alternatively, the tread 18 may be made by introducing the compositions into either a quad-extruder equipped with different zone dies or into a gear pump extruder so as to form a green tread with different compounds that, when cured, result in the different layers described above.

Furthermore, the pneumatic tire 10 can be built on a tire forming drum (not shown), vulcanization temperature can be from about 100° C. to about 250° C. For example, passenger tires might be cured at a temperature ranging from about 150° C. to about 180° C. and truck tires might be cured at a temperature ranging from about 130° C. to about 170° C. Cure time may vary from about five minutes to several hours. Cure time and temperature depend on many variables well known in the art, including the composition of the tire components, including the cure systems in each of the layers, the overall tire size and thickness, etc. Vulcanization of the assembled tire results in complete or substantially complete vulcanization or crosslinking of all elements or layers of the tire assembly, e.g. the tread 18, the carcass 16, and the sidewalls 12. In addition to developing the desired strength characteristics of each layer and the overall structure, vulcanization enhances adhesion between these elements, resulting in a cured, unitary tire 10 from what were separate, multiple layers.

Non-limiting examples of the first and second elastomeric compounds for use in the outer and inner layers 36, 38 in accordance with the detailed description are disclosed below. The example is merely for the purpose of illustration and is not to be regarded as limiting the scope of the invention or the manner in which it can be practiced. Other examples will be appreciated by a person having ordinary skill in the art.

TABLE 1

| Ingredient | 1st elastomeric compound (parts) | 2nd elastomeric compound (parts) |
|---|---|---|
| 40% Styrene SSBR[1] | 103 | — |
| 21% SSBR[2] | — | 70 |
| Cis 1,4-polybutadiene A[3] | — | 30 |
| Cis 1,4-polybutadiene B[4] | 25 | — |
| Precipitated Silica[5] | 90 | 60 |
| Carbon black A[6] | 9 | — |
| Carbon black B[7] | — | 4.8 |
| Rubber processing aid[8] | 1.5 | 16.5 |
| Coupling agent[9] | 7.6 | 4.8 |
| Resins[10] | 15 | — |
| Antidegradant | 4 | 3 |
| Stearic acid | 4 | 3 |
| Zinc oxide | 0.5 | 1.8 |
| Sulfur | 0.6 | 1.9 |
| Accelerators | 1.9 | 3.2 |

[1] oil extended, methoxysilano-functionalized solution polymerized copolymer of butadiene and styrene, SSBR, with 40% bound styrene, 14.4% vinyl content, available commercially as SE SLR-6430 from Dow Deutschland Anlagengesellschaft GmbH
[2] functionalized SBR as a solution polymerization prepared styrene/butadiene rubber functionalized with an alkoxysilane group and functional group comprised of a thiol group and having 21% bound styrene as SLR SE4602 ™ from Dow Europe GmbH
[3] high cis 1,4-polybutadiene rubber, available commercially as Bud1208 ™ from The Goodyear Tire & Rubber Company
[4] about 95% to about 98% cis 1,4-isomeric units, about 1% to about 3% cis 1,4-isomeric trans units, and about 0.3% to about 9% vinyl 1,2-content; a number average molecular weight (Mn) in a range of from about 230,000 to about 250,000 with a heterogeneity index (Mw/Mn) in a range of from about 1.5 to 1 to about 2 to 1, and a $T_g$ in a range of from about −104° to about −109° C., available commercially from Lanxess as CB25 ™
[5] precipitated Silica available commercially as Zeosil 1165MP ™ from Rhodia
[6] ASTM designation N134
[7] ASTM designation N330
[8] rubber processing oil and wax
[9] bis-(3-triethoxysilylpropyl) poly sulfide having an average in a range of from about 3.6 to about 4 connecting sulfur atoms in its polysulfidic bridge available commercially as Si69 ™ from Evonic Degussa
[10] styrene/alphamethylstyrene resin and medium hard Coumarone Indene resin The first and second elastomeric compositions were individually prepared according to industry standard practices. The compositions were cured at a temperature of about 160° C. for about 14 minutes and the physical properties of the compounds were evaluated. The physical property data is provided in Table 2.

TABLE 2

| Properties | 1st elastomeric compound | 2nd elastomeric compound |
|---|---|---|
| Wet traction | | |
| 0° C. Rebound[1] | 8.2 | 25.2 |
| tan δ (3%; 0° C.; 10 Hz)[2] | 0.615 | 0.337 |
| Rolling Resistance | | |
| Room Temp. Rebound[1] | 23.6 | 51.2 |
| 100° C. Rebound[1] | 61.1 | 75.5 |
| tan δ (3%; 30° C.; 10 Hz)[2] | 0.287 | 0.12 |
| tan δ (3%; 60° C.; 10 Hz)[2] | 0.176 | 0.076 |
| tan δ (10%; 100° C.; 11 Hz)[3] | 0.112 | 0.069 |
| Treadwear | | |
| Grosch Abrasion rate[4] @ Low, mg/km | 5.67 | 2.14 |
| Grosch Abrasion rate[4] @ Med, mg/km | 82.8 | 31.5 |
| Grosch Abrasion rate[4] @ High, mg/km | 410 | 297 |

TABLE 2-continued

| Properties | 1st elastomeric compound | 2nd elastomeric compound |
|---|---|---|
| Other properties[5] | | |
| 100% Modulus, MPa | 2.65 | 1.80 |
| 300% Modulus, MPa | 13.9 | 13.4 |
| Tensile Strength, MPa | 21.0 | 17.3 |
| Elongation at Break, % | 441 | 384 |
| Room Temp. Hardness | 75.9 | 60.8 |
| 100° C. Hardness | 66.3 | 58.6 |

[1]rebound as measured by ASTM D1054
[2]dynamic measurement from the temperature sweep at 3% strain and 10 Hz by ASTM B5992
[3]rubber process analyzer (RPA) instrument
[4]measured on a LAT-100 Abrader
[5]Automated Testing System (ATS) instrument As indicated by the data in Table 2, the first elastomeric compound has a greater wet traction than the second elastomeric compound. This translates to shorter vehicular stopping distances for equal exposure between the first elastomeric compound and the second elastomeric compound. As set forth above, a lower rebound value is an indication of better wet traction. Referring to Table 2, the value of 0° C. rebound of 8.2 of the first elastomeric compound indicates that it has a better wet traction than the second elastomeric composition which has a 0° C. rebound value of 25.2. The relative improvement between the wet traction of the first elastomeric compound and the second elastomeric compound is indicated by the ratio between the two, which is slightly greater than 3 to 1.

The tan δ value at 0° C., 3% strain, and 10 Hz for each compound is also a relative indication of wet traction. A higher value of tan δ at 0° C. is an indication of better wet traction. As shown, the first elastomeric composition has a tan δ value at 0° C. of 0.615 and the second elastomeric composition has a tan δ value of 0.337 or a ratio of about 1.8 to 1. The relative difference in values between the first and second elastomeric compounds indicates a proportional and significant difference in wet traction.

As is also indicated by the data in Table 2, the second elastomeric compound is characterized as having a lower rolling resistance than the first elastomeric compound. This is so because all of the room temperature and elevated temperature rebound values are greater than the respective room and elevated temperature rebound values for the first elastomeric composition. As shown, the measured room temperature rebound for the second elastomeric compound is about 51.2, whereas the respective rebound for the first elastomeric compound is about 23.6. The ratio of the two is consequently slightly greater than 2 to 1 for relative room temperature rebound. The elevated temperature rebound values are similarly different with the second elastomeric compound being greater than the first elastomeric compound by a ratio of about 1.2 to 1.

Further, Table 2 also provides data that indicates that the 30° C. and 60° C. tan δ values of the second elastomeric compound are lower than the 30° C. and 60° C. tan delta values for the first elastomeric compound. Accordingly, the second elastomeric compound has a lower hysteresis energy loss than the first elastomeric compound at these temperatures. As such, the second elastomeric compound has a lower rolling resistance than the first elastomeric compound. As calculated from their respective values, the second elastomeric compound has tan δ values that are greater by a ratio of about 2.3 to 1 for each of the measurements at 30° C. and 60° C. relative to the first elastomeric composition. Similarly, the tan δ values at 10% strain, 100° C., and 11 Hz for the second elastomeric compound is greater than the corresponding value for the first elastomeric compound by a ratio of about 1.6 to 1. This is considered to be significant as a tread configured with the first and second elastomeric compound as described herein may have a reduced hysteresis loss that promotes low rolling resistance and consequently improved fuel efficiency versus a homogenous tire, though the tread would be expected to maintain wet traction as the tread wears.

With regard to wear resistance, the data in Table 2 indicates that the second elastomeric compound has relatively high resistance to wear as compared to the first elastomeric compound. In particular, each of the abrasion rates for the second elastomeric compound measured lower than the first elastomeric compound. According to the data, the second elastomeric compound abrades at a rate that is less than half of the abrasion rate measured for the first elastomeric compound with the "severe" abrasion rate being around 38% less than the abrasion rate of the first elastomeric compound.

Also according to Table 2, the mechanical properties indicate that the two compounds meet or exceed industry norms for use of the materials in a tread.

While the present invention has been illustrated by the description of one or more embodiments thereof, and while the embodiments have been described in considerable detail, they are not intended to restrict or in any way limit the scope of the appended claims to such detail. Additional advantage and modifications will readily appear to those skilled in the art. The invention in its broader aspects is therefore not limited to the specific details, representative methods and illustrative examples shown and described. Accordingly, departures may be made from such details without departing from the scope or spirit of applicant's general inventive concept.

What is claimed is:

1. A pneumatic tire comprising:
an outer circumferential tread having an outer tread layer in direct and continuous contact with an inner tread layer, the outer and inner tread layers together defining the tread thickness, the inner tread layer comprising a first elastomeric compound or a second elastomeric compound and the outer tread layer comprising the other of the first elastomeric compound or the second elastomeric compound, the second elastomeric compound having lower rolling resistance and greater resistance to treadwear than the first elastomeric compound, the inner tread layer increases in thickness across at least a widthwise portion of the tread with a maximum thickness of one of the inner tread layer and the outer tread layer occurring near at least one of a first shoulder and a second shoulder of the tread, whereby as the tread wears, the inner tread layer defines a greater proportion of a running surface of the tread;
wherein the first elastomeric compound comprises a blend of about 75 parts of high styrene solution styrene butadiene rubber (SSBR) and about 25 parts butadiene rubber (BR), resins, and about 70 phr to about 110 phr silica; and
wherein the second elastomeric compound comprises a blend of about 70 parts of low styrene SSBR and about 30 parts BR, and less than 70 phr silica.

2. The tire of claim 1 wherein a maximum thickness of the inner tread layer is approximately equal to the tread thickness.

3. The tire of claim 1 wherein a maximum thickness of the inner tread layer is located near the first shoulder.

4. The tire of claim 1 wherein a maximum thickness of the outer tread layer is located near the first shoulder.

5. The tire of claim 1 wherein the maximum thickness of the outer tread layer is near the first shoulder and a minimum thickness of the outer tread layer is near the centerline of the tread.

6. The tire of claim 1 wherein the outer tread layer continuously increases in thickness from a minimum thickness to the maximum thickness between the first and second shoulder, respectively.

7. The tire of claim 1 wherein the variation in the thickness of the outer tread layer from the maximum thickness to a minimum thickness is approximately linear.

8. The tire of claim 1 wherein the outer tread layer continuously increases in thickness from near a central region of the tread to near the first shoulder.

9. The tire of claim 1 wherein the outer tread layer continuously increases in thickness from near a central region of the tread to near the first and second shoulder.

10. The tire of claim 1 wherein the first elastomeric compound has a greater peak in tan δ at a higher temperature than the temperature at which tan δ peaks in the second elastomeric compound.

11. The tire of claim 1 wherein the first elastomeric compound has a greater wet traction than the second elastomeric compound.

12. The tire of claim 1 wherein the first elastomeric compound contains a greater portion of silica than the second elastomeric compound.

13. The tire of claim 1 wherein the tread comprises a tread pattern including tire grooves that extend through the outer tread layer and into the inner tread layer, and wherein the tread is configured to wear such that the rate of exposure of the inner tread layer substantially compensates for a reduction in the volume of the tire grooves.

14. The tire of claim 13 wherein the inner tread is exposed in the tire grooves.

15. The tire of claim 1 wherein the first elastomeric compound has a greater glass transition temperature than the second elastomeric compound.

16. The tire of claim 1, wherein a glass transition temperature of the first elastomeric compound is in a range from about −10° C. to about −40° C.; and wherein a glass transition temperature of the second elastomeric compound is in a range from about −30° C. to about −60° C.

17. The tire of claim 1, wherein the first elastomeric compound further includes about 5 phr to about 20 phr resins; and wherein the second elastomeric compound further includes up to about 10 phr resins.

\* \* \* \* \*